Oct. 6, 1953  J. I. CARLSON  2,654,464
CONVEYER CHAIN LINK
Filed March 30, 1949  2 Sheets-Sheet 1
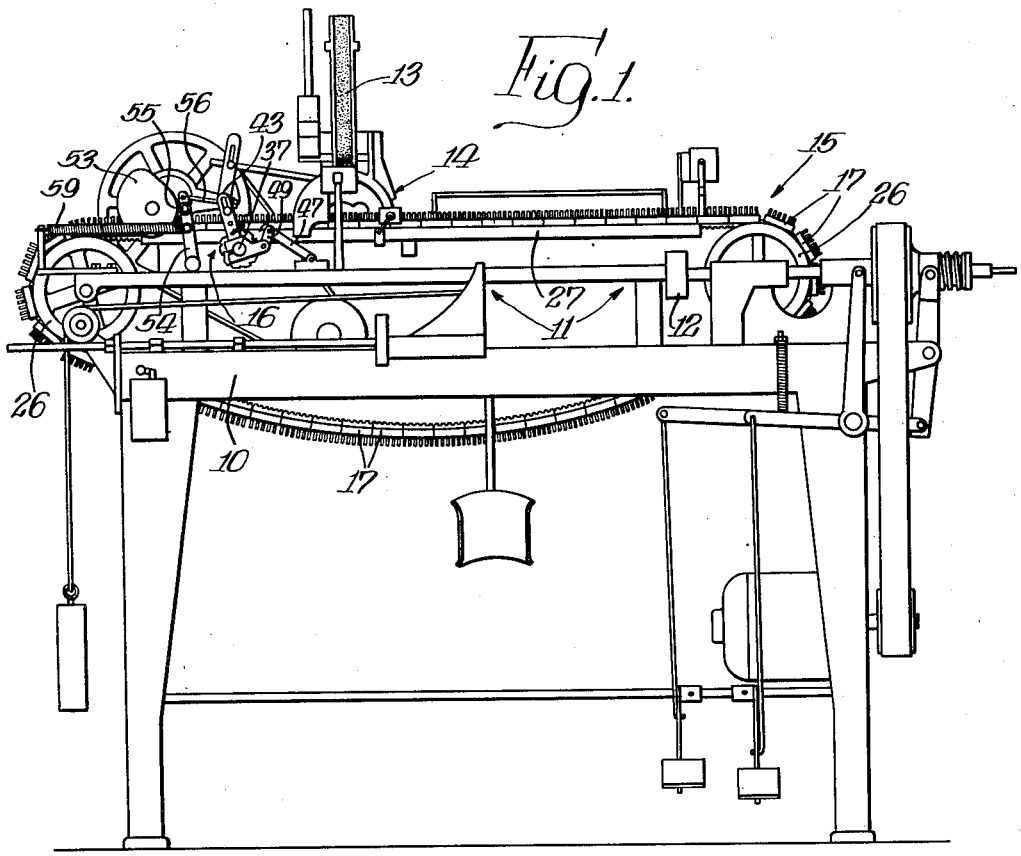
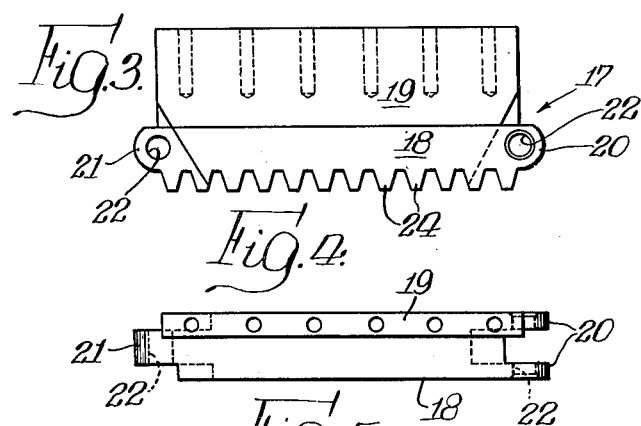
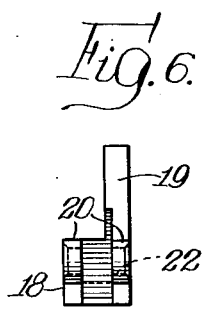
INVENTOR.
John I. Carlson.
BY
his Atty's Oct. 6, 1953                J. I. CARLSON                2,654,464
                         CONVEYER CHAIN LINK
Filed March 30, 1949                                 2 Sheets-Sheet 2
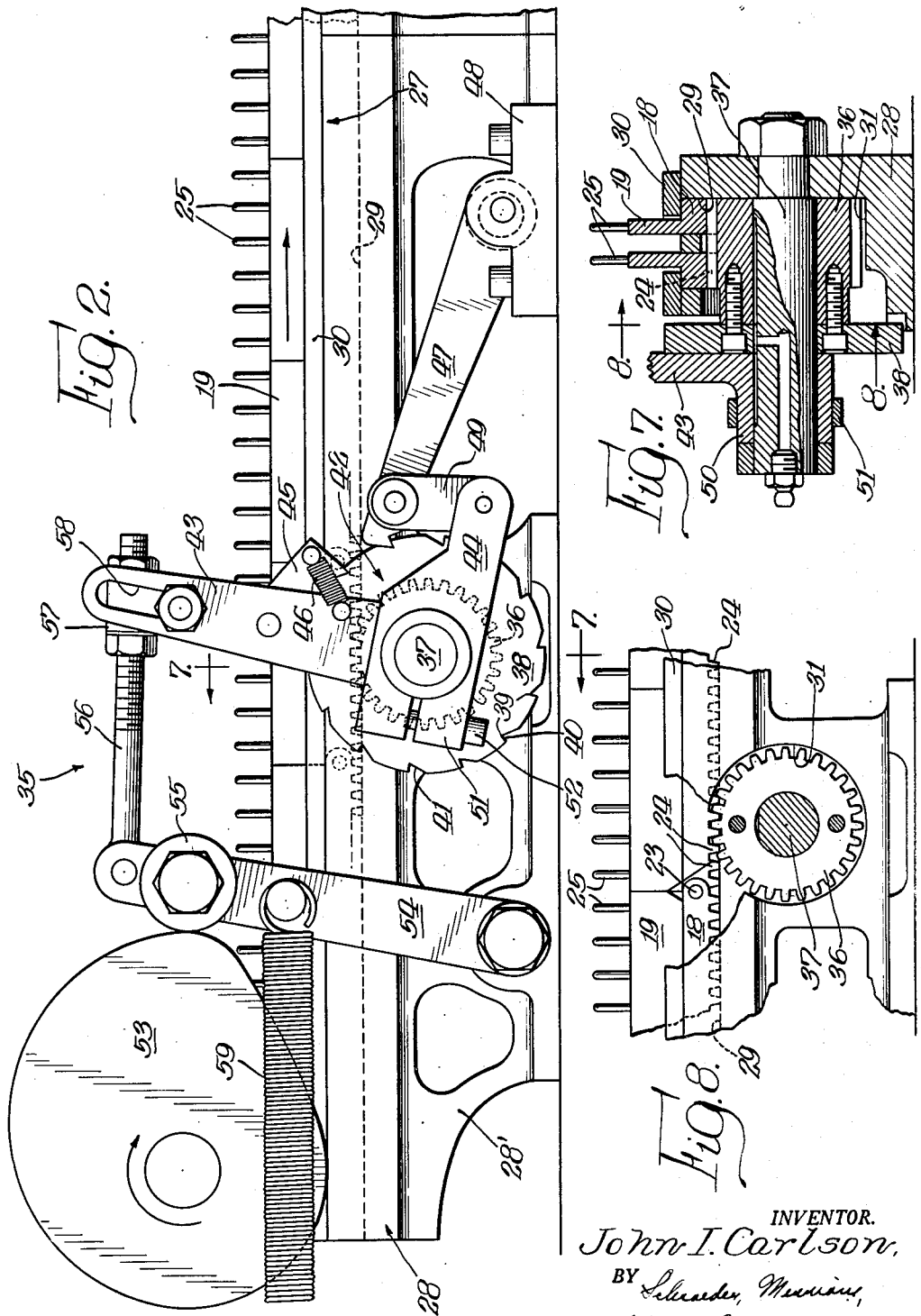
INVENTOR.
John I. Carlson.

Patented Oct. 6, 1953

2,654,464

UNITED STATES PATENT OFFICE 2,654,464

CONVEYER CHAIN LINK

John I. Carlson, Aurora, Ill., assignor to Carlson Tool & Machine Company

Application March 30, 1949, Serial No. 84,378

4 Claims. (Cl. 198—189)

The invention relates generally to a conveyor and actuating mechanism therefor and more particularly to a conveyor adapted for transporting bristles in a brush making machine.

One object of the invention is to provide a conveyor which in operative position is rigid but which is capable of continuous movement in one direction as distinguished from the reciprocatory movement of the prior art bristle conveyors.

Another object is to provide a conveyor composed of a plurality of rigid links interconnected to form an endless chain having an operative run in which the links partake of the nature of a rack.

Still another object is to provide a conveyor composed of a plurality of rigid links interconnected to form an endless chain, each link having a base portion with gear teeth formed on one face thereof and an upstanding part with bristle-retaining pins, the chain having an operative run in a guideway which holds the links firmly upright and in continuous end to end position.

A further object is to provide a ratchet drive for advancing the conveyor having a plurality of pawls coupled for joint action in an improved manner to lock and prevent overrunning of the ratchet at the end of each advancing movement.

Other objects and advantages will become apparent from the following detailed description taken in connection with the accompanying drawings, in which:

Fig. 1 is a front elevational view of a brush making machine embodying the features of my invention.

Fig. 2 is an enlarged fragmentary elevational view illustrating a portion of the operative run of the conveyor and driving mechanism therefor.

Fig. 3 is an enlarged side elevational view of a single link of the conveyor minus the pins.

Figs. 4, 5 and 6 are top, bottom and end elevational views, respectively, of the link of Fig. 3.

Fig. 7 is a transverse sectional view taken approximately along the line 7—7 of Fig. 2.

Fig. 8 is a fragmentary view taken in the plane of Fig. 2 just forwardly of the conveyor and its guide means.

While the invention is susceptible of various modifications and is adaptable for use under a variety of circumstances, it is here shown and will hereinafter be described for exemplary purposes as embodied in a machine for the making of twisted wire brushes. It is not intended, however, that the invention is to be limited thereby to the specific use or embodiment shown. On the contrary, it is intended to cover all modifications and adaptations falling within the spirit and scope of the invention as defined in the appended claims.

As above stated, the invention is, for exemplary purposes, disclosed as embodied in a machine for making brushes of the twisted wire type. Such a machine comprises generally a bed 10 upon which is mounted means, generally indicated 11, including a rotary chuck 12 for twisting the wires constituting the holder for bristles, a hopper 13 for bristles, bristle-picking mechanism 14, and bristle-conveying means, generally designated 15, with its driving means 16. Inasmuch as the parts of the machine other than the conveyor and its driving mechanism form no part of the invention save as those elements may enter broadly into combination with the conveyor and its driving mechanism, no detailed description will be made thereof. Suffice it to say, therefore, that for the most part they are of standard, well known construction.

Turning now to the conveyor, it is composed of a plurality of blocks or links 17 adapted to be pivotally connected to form an endless chain. Each such link, as best seen in Figs. 3 to 7, inclusive, comprises a base portion 18 and a working portion 19. The base portion is rectangular in cross section, in fact, almost square, and terminates at one end in a pair of bifurcations or ears 20 and at the other end in a tongue 21 the width of which is such as to make it receivable between the bifurcations 20. The bifurcations and the tongue are drilled laterally to form bores or holes 22 for the reception of a linking pin or bolt 23. Preferably the holes 22 in the bifurcations are slightly countersunk on the outer sides of the link so as to permit the head of the pin or bolt 23 to terminate flush with the sides of the links. The bifurcations 20 are most conveniently formed by making a milling cut at an angle of about 60° to the longitudinal center line of the link centrally of the end thereof, while the tongue 21 is formed by making two such milling cuts into the opposite end at the outside of the link. This not only forms the bifurcations or the tongue but also provides the necessary clearance to permit pivoting of one link relative to the other.

On what is the inner face of the link when assembled into a chain are formed gear teeth 24 extending transversely of the link over the entire length thereof including the bifurcations and the tongue. It will be appreciated, of course, that the bores 22 and the gear teeth 24 have been maintained in such relationship that when the links are assembled into a chain and are disposed in a straight line the teeth on the tongue and on the bifurcations will be in registry.

The working portion 19 forms an elongated rectangle in transverse cross section and extends from the base portion in a direction opposite the teeth 24 and at one side of the base portion so as to give the link as a whole an L-shaped transverse cross section. It is a feature of this invention that the ends of the portion 19, or at least the outermost portions of the end faces, terminate in a plane passing through the center line of the bores in the bifurcations or the tongue, and perpendicular to the longitudinal plane or center line passing through the center of the bores 22. No portion of the working portion may extend beyond these planes though the working portion may terminate short of these planes provided the outermost areas lie in the planes defined. Herein the entire ends are shown flat and lying in the defined limiting planes. This facilitates manufacture and is advantageous in the further respect that it serves to enhance the rigidity of the chain as will presently be described. Whenever and wherever the term "end" or "end face" is employed in the claims, it is intended to mean any portion of the end and not necessarily the entire end. Pins 25 are inserted at uniform intervals along the working portion to define sections or pockets for the receipt of bristles or any other articles to be conveyed.

The conveyor extends generally longitudinally of the machine and is guided for movement by a pair of pulleys or wheels 26 and a straight fixed guideway, generally designated 27. The pulleys 26 are mounted near the ends of the machine for free rotation each being formed at its periphery with a groove for the reception of the links but otherwise having no meshing or driving engagement with the links. Intermediate the ends of the machine is the guideway 27. Herein this takes the form of a long, narrow casting 28 mounted on the bed 10 in spaced relation thereto through webs 28' to provide a guideway for the upper or operative run only of the conveyor. Formed in the upper surface of the casting 28 is a groove 29 of the same cross sectional shape and size as the base portion 18 of the links so that the latter are slidably receivable therein. Completing the guideway is a strip 30 bolted to the casting 28 and overlying the part of the base portion 18 not taken up by the working portion 19. Near one end the casting 28 has a recess 31 formed therein, this recess extending upwardly to expose the teeth 24 of the links as they pass through the recess (see Fig. 8).

It is believed apparent from the foregoing that because of the construction of the individual links the resulting chain is flexible and capable of passing around the pulleys 26 while at the same time when the links are held in a straight line, as when they are in guideway 27, the chain partakes of the nature of a rack providing a continuous series of gear teeth on the under side and a rigid continuous rod and surface on the outer side. This is possible because of the location and formation of the ends of the working portion 19 of the links which when the links are in the guideway 27 abut to form the continuous rod and surface.

While a single chain has been so far described, the present embodiment of the conveyor actually incorporates two such chains, as best seen in Fig. 7. It is another feature of this invention that because of the nature of the chain the resulting conveyor can be given a variety of widths by mere variation in the spacing of the chains, for each chain is complete and operative within itself independent of any associated chain for support.

Means, generally designated 35 (see Fig. 2), is provided for advancing the chains simultaneously. This advance may be uniform and continuous or, as here, may be intermittent so as to coordinate the advance with the operations of the bristle picker mechanism positioning a free section or space of the chain beneath the picker mechanism with each oscillation thereof. Drive of the chains is effected not through the medium of the pulleys 26 but through the medium of a gear 36 disposed in the recess 31 in the casting 28 in meshing relationship with the teeth 24 of the links as they pass through the guideways 27. The gear 36 is rotatable on a king pin 37 fixed at one end in a web 28' of the casting 28. Also rotatable on the king pin is a ratchet disk 38 bolted to the gear 36 and provided with the usual notched or ribbed formations adaptable for engagement by pawls or dogs. While these formations may take a variety of forms, or be variously located, they are here formed in the peripheral edge of the disk 38 and take the shape of notches 39 having a substantially radial face 40 and an inclined face 41, with the radial face facing opposite to the direction of movement of the disk.

Mounted on the king pin 37 for oscillation thereabout is a pawl-carrying and actuating member 42 herein having a long arm 43 and a shorter arm 44 disposed substantially at right angles to one another. Pivotally mounted on the long arm is a dog or pawl 45, hereinafter designated as the actuating pawl, yieldably urged by means of a spring 46 into engagement with the periphery of the disk 38. Pawl 45 is positioned, as is readily seen in Fig. 2, in a manner to drop into the notches 39 when the member 42 is oscillated in a clockwise direction so as to carry the disk 38 therewith. On return or counter-clockwise movement of the member 42, the pawl 45 slides over the periphery of the disk and any notches that may be traversed in that movement.

A second pawl 47 is also provided which serves as a locking pawl coming into operation at the end of the advancing movement of the member 42 to prevent any overrunning of the conveyor. This pawl is pivotally mounted at one end on a fixed journal, herein a block 48 on the frame of the machine. Near its other or free end the pawl 47 is pivotally connected by means of a link 49 with the shorter arm 44. The pawl 47, link 49 and the arm 44 are so proportioned and positioned that as the member 42 reaches the end of its forward or actuating movement the end of the pawl 47 engages one of the notches 39. When so engaged, the free end of the pawl abuts the inclined surface 41 of the notch and the pawl and the ratchet disk 38 have an over-center or V-shaped relationship with any excessive rotation of the disk 38 resisted by a component of force acting longitudinally of the pawl 47. Preferably the member 42 is composed of two parts, the one consisting of the arm 43 and a sleeve 50 integral therewith, the other consisting of the arm 44. Arm 44 has a split collar portion 51 receivable over the sleeve 50 and may thus be adjusted to any angular relationship to the sleeve and then secured in that position by tightening the screw 52.

The member 42 is oscillated in timed relation with the picker mechanism through the medium of a peripheral cam 53 driven from the same source of power as the picker mechanism. Pivotally mounted on the casting 28 is a lever 54 which near its other end carries a cam follower 55 disposed for engagement with the periphery of the cam 53. At its extreme free end, lever 54 has pivotally connected thereto a rod link 56 pivotally connected by adjustable means 57 carried at its other end with the arm 43. While, of course, the notches 39 are so spaced circumferentially of the ratchet disk 38 as to conform to the spacing of the pins 25 on the links, arm 43 preferably is formed with a slot 58 so that the means 57 may be connected to the arm at varying radial distances and thereby vary the throw of the arm. Follower 55 is held against the cam 53 and return movement of the member 42 is effected by means of a tension spring 59 attached at one end to the lever 54 and at the other end to a stationary part of the machine.

It is believed apparent from the foregoing that I have perfected a conveyor which has many advantages and unique features. Because it is in the form of a linked or chain construction, it is capable of use as an endless conveyor, readily passing around pulleys or wheels while at the same time the operative run of the conveyor avoids the disadvantageous characteristics of a conventional chain in that it provides a continuous, uninterrupted surface and partakes of the nature of a rigid bar. The links composing the chain, while in the operative run, are firmly held in upright position each chain being self-supporting, not requiring a second series of links as is customary and thus capable of use either singly or in multiples. In this manner a conveyor may readily be made of any width desired simply by spacing the chains and if the objects supported are not stiff enough to rest merely on a pair of such chains any desired number of intermediate chains may be provided.

The conveyor is particularly adaptable in the embodiment disclosed and makes possible greatly enhanced operation of the machine equipped with this conveyor as compared with the old reciprocatory type rack. Also contributing to the successful employment of the conveyor under circumstances where intermittent advance is essential is the construction providing for coordinated operation of an actuating and a locking pawl. With this construction, the speed with which the conveyor is advanced may be made as high as desired or as is practical without danger that there will be an overrunning by the conveyor.

I claim as my invention:

1. A conveyor comprising a plurality of rigid links pivotally interconnected at their ends to form an endless chain, each link comprising a base portion terminating at its ends in interlinking means and having gear teeth on its inner face and a working portion projecting from the face of said base portion opposite said gear teeth and having flat ends perpendicular to said base portion, guide means for the chain including a pair of pulleys and a straight guideway for the operative run of the chain, the guideway receiving the base portion of each link slidably therein and having a slot for the projection therethrough of the working portion of each link whereby the links when in the guideway are held firmly in upright position with the ends of the working portions in abutting relationship to form a rigid continuous bar, and a gear meshing with the teeth on said links for driving the chain.

2. A conveyor comprising a plurality of rigid links pivotally interconnected at their ends to form an endless chain, each link comprising a base portion terminating at one end in longitudinally extending bifurcations and at the other end in a longitudinally extending tongue receivable between said bifurcations, the base portion having gear teeth on its inner face including the inner face of the tongue and bifurcations, the tongue and bifurcations being drilled laterally to be interconnected by a pin with complementary parts of an adjacent link and when so connected and disposed in a straight line having the teeth thereon coincide, and a working portion projecting from the face of said base portion opposite said gear teeth and having flat ends perpendicular to said base portion, guide means for the chain including a pair of pulleys and a straight guideway for the operative run of the chain causing the links during the run to take the form of a rack providing a continuous working surface and a continuous series of gear teeth, and a gear meshing with the teeth on said links for driving the chain.

3. An element in a continuous conveyor comprising an elongated block having a base portion and a working portion, said base portion having at its ends complementary interlinking means and having opposite faces with a series of gear teeth on one face, the opposite face being a surface adapted to run in a retaining guideway, the working portion having flat ends perpendicular to a plane passing through the axes of the interlinking means on the ends of said working portion to abut with the ends of adjacent links and form a continuous working surface when the links are disposed in a straight line, said opposite face when in a guideway maintaining said working portions abutting.

4. An element for an endless conveyor comprising an elongated block having a base portion and a working portion of lesser width than the base portion, the base portion having at one end longitudinally extending bifurcations and having at the other end a tongue receivable between the bifurcations of an adjacent block, the bifurcations and tongue being drilled laterally to receive a pin for pivotally interlinking said blocks, a series of gear teeth formed on said base portion including said tongue and bifurcations, said base having a surface opposite said teeth adapted to engage in a retaining guideway, the working portion having flat ends perpendicular to a plane passing through the center line of the drilled holes in said bifurcations and tongue to abut with the ends of adjacent blocks when linked together and disposed in a straight line, said surface opposite said teeth maintaining the working portions abutting when engaged in a guideway.

JOHN I. CARLSON.

References Cited in the file of this patent

UNITED STATES PATENTS

| Number | Name | Date |
|---|---|---|
| 1,265,673 | Kjelstad | May 7, 1918 |
| 1,275,988 | Juengst | Aug. 13, 1918 |
| 1,555,867 | Marshall | Oct. 6, 1925 |
| 1,578,469 | Read | Mar. 30, 1926 |
| 1,687,845 | Nachenius | Oct. 16, 1928 |
| 1,781,750 | Dodge et al. | Nov. 18, 1930 |
| 1,804,701 | Mojonnier | May 12, 1931 |
| 1,831,639 | Reece | Nov. 10, 1931 |
| 1,888,352 | Lipps | Nov. 22, 1932 |
| 2,033,258 | Simms et al. | Mar. 10, 1936 |
| 2,313,524 | Driesbach et al. | Mar. 9, 1943 |
| 2,488,766 | De Moss | Nov. 22, 1949 |